United States Patent
Yamada

(10) Patent No.: US 7,181,069 B2
(45) Date of Patent: Feb. 20, 2007

(54) IMAGE PROCESSING APPARATUS

(75) Inventor: Hideaki Yamada, Higashihiroshima (JP)

(73) Assignee: Sharp Kabushiki Kaisha, Osaka (JP)

( * ) Notice: Subject to any disclaimer, the term of this patent is extended or adjusted under 35 U.S.C. 154(b) by 577 days.

(21) Appl. No.: 10/667,377

(22) Filed: Sep. 23, 2003

(65) Prior Publication Data

US 2005/0100189 A1 May 12, 2005

(30) Foreign Application Priority Data

Sep. 24, 2002 (JP) .......................... P2002-277921

(51) Int. Cl.
*G06K 9/36* (2006.01)
*G06K 9/00* (2006.01)

(52) U.S. Cl. ...................... 382/232; 382/284

(58) Field of Classification Search ................ 382/100, 382/162, 166, 173, 232, 233, 244, 246, 250, 382/251, 284; 375/240.1; 345/589, 630, 345/600–604; 358/226.15, 426.02, 515, 358/523

See application file for complete search history.

(56) References Cited

U.S. PATENT DOCUMENTS

| | | | | |
|---|---|---|---|---|
| 4,409,623 A | * | 10/1983 | Kobayashi et al. | 358/426.02 |
| 4,737,772 A | * | 4/1988 | Nishi et al. | 345/603 |
| 5,339,164 A | * | 8/1994 | Lim | 358/426.02 |
| 2001/0030655 A1 | * | 10/2001 | Anwar | 345/630 |
| 2005/0180500 A1 | * | 8/2005 | Chiang et al. | 375/240 |

FOREIGN PATENT DOCUMENTS

JP 2000-106624 A 4/2000

* cited by examiner

*Primary Examiner*—Amir Alavi
(74) *Attorney, Agent, or Firm*—Birch, Stewart, Kolasch & Birch, LLP

(57) ABSTRACT

By using a data combining portion, the predetermined data is combined with the original image data on a pixel position with an upper limit gray scale value in a direction of increase of the gray scale value and a combined image data is generated. Since the predetermined data is combined outside an extent of the gray scale of the original image data, there is no deterioration of the quality of the original data and a user never perceives the predetermined data combined outside the extent of the gray scale of the original image data. In addition, since the predetermined data is embedded in combined image data in itself encoded by an encoding portion, the predetermined data cannot be separated from the original image data before the encoded combined image data is decoded.

12 Claims, 11 Drawing Sheets

ORIGINAL IMAGE DATA 1

COMBINED IMAGE DATA 4

IMAGE PROCESSING APPARATUS

This nonprovisional application claims priority under 35 U.S.C. § 119(a) on Patent Application No(s). 2002-277921 filed in JAPAN on Sep. 24, 2002, which is(are) herein incorporated by reference.

BACKGROUND OF THE INVENTION

1. Field of the Invention

The present invention relates to an image processing apparatus which combines various predetermined data such as image data, character data and voice data or the like with original image data to generate combined image data and separates the various predetermined data from the combined image data.

2. Description of the Related Art

It has become easy for a large number of people to share the same data through a network such as Local Area Network (abbreviated as "LAN") or the Internet or the like by digitalization of multimedia data such as an image or a voice or the like.

Contents business draws people's attention as business utilizing a network. Contents business is a business which directly transmits digital data such as an image, a music, a video or the like to a consumer via a network. E-commerce by which commercial products are dealt with on the network makes commerce of the commercial products more efficient, but the e-commerce requires transporting means such as a truck or the like to be used for delivering the commercial products when the commercial products in themselves are corporeal. On the contrary, the contents business does not require the transporting means since the commercial products in themselves are delivered to the consumer via the network. Consequently, pioneering a new business making full use of such feature as mentioned above is expected.

However, digital data can be easily copied and therefore, unless any countermeasure for preventing such a copy as mentioned above is taken, there is possibility that an illegal copy is rampant. An electronic watermark is researched as effective technique for preventing the illegal copy.

The electronic watermark relates to technique for utilizing feature of human perception such as visual perception and auditory perception or the like and embedding different predetermined data from digital contents in themselves such as a still image, a motion image and audio or the like into the digital contents so that it is difficult for a man to perceive the different predetermined data. The electronic watermark cannot directly prevent the illegal copy, but can indirectly prevent the illegal copy by restraining the illegal copy (e.g. as referred to Japanese Unexamined Patent Publication JP-A 2000-106624 (2000)).

To realize the above mentioned electronic watermark, various methods are proposed. For example, it is possible that predetermined data is embedded in low-order bit of a gray scale value of original image data as a simple method of embedding the predetermined data in the original image data.

A sampling point sampled at the time of digitalizing an image is called a pixel. This pixel becomes a minimum unit configuring a digital image. In a monochrome facsimile, each pixel is either white or black and therefore, each pixel has two gray scales and the two gray scales can be represented as one bit by allocating a gray scale values 0 to white and allocating a gray scale value 1 to black. However, with respect to a gray-scale image which is of color, it is required that the gray scale of the pixel is increased. The gray scale value of the color image is often represented as 8 bits in view of easiness of handling the gray scale value on a computer.

By the way, since a cone which is a color sensitive organ in a human's eye consists of three kinds L, M and S (color space for 3 primary colors), three values are required for representing a plurality of colors, but, in other words, existence of the three values is sufficient to represent the plurality of colors. Changing the three gray scale values of red(R), green(G) and blue (B) enables various kinds of colors to be displayed on a display. Therefore, a color image is represented by 8 bit concerning each of RGB.

The low-order about 2 bit of the gray scale value of the color image generally and originally means noise, and therefore, even if the predetermined data is embedded in this low-order bit, there is less deterioration of quality of the color image in the case of small amount of the predetermined data. However, the larger amount of the predetermined data becomes, the greater deterioration of the quality of the color image becomes. However, a method for realizing electronic watermark actually is more sophisticated and retrieving the predetermined data embedded in the original image data cannot be easily performed, and deterioration of quality of the color image is inevitably accompanied. In addition, in advance of compression technique, since the predetermined data is embedded in the original image data and then the whole of the image data is compressed, it is essential that the method for realizing electronic watermark should be an embedding method having good endurance for compression, in other words, a method by which the embedded predetermined information can be retrieved when the whole of the image data is encoded and then decoded.

Since an image has large amount of data, the image is often compressed. A method of compression encoding comprises lossless compression and lossy compression. The lossless compression is conversion by which data decompressed after compression of the data perfectly coincides with data having existed before compression of the data. The lossy compression is conversion by which data decompressed after compression of the data perfectly does not coincide with data having existed before compression of the data and once the compressed data is not perfectly returned. In the lossy compression, a compression ratio is enhanced by leaving information on a part of the display which is sensitively recognized by a human's eye and eliminating information especially on a part of the display which is more insensitively recognized by the human's eye.

The lossy compression uses transform encoding, for instance, with use of discrete cosine transform (abbreviated as "DCT") and wavelet transform or the like. In the transform encoding, pixels lined on a plane are transformed to spatial frequency components and the spatial frequency components and combination of this transform with quantization of the pixels eliminates information of high frequency component which is insensitively recognized by the human's eye and realizes high compression ratio of pixel data. In JPEG (Joint Photographic coding Expert Group) which is international standard for a method of still image compression encoding, DCT is used for transform encoding and in JPEG2000 wavelet transform is used for transform encoding.

A method, by which the original image data is encoded as mentioned above and then the predetermined data is written in a header and a control signal of a code, is also considered.

When the predetermined data is embedded in low-order bit of the gray scale value of the above mentioned image data, there is a problem of unavoidable deterioration of quality of the image in which the predetermined data is embedded.

In addition, when the predetermined data is written in the header and the control signal of the code, deterioration of the quality of the image can be avoided, but there is a problem that the predetermined data can be simply retrieved and an illegal copy of the original image data can be easily made because the predetermined data is written separately from the original image data.

SUMMARY OF THE INVENTION

An object of the invention is to provide an image processing apparatus capable of combining predetermined data with original image data and without incurring deterioration of quality of a resultant image, and preventing illegal copying of the original image data by making retrieval of the combined predetermined data difficult.

In addition, another object of the invention is to provide an image processing apparatus applicable to easy confirmation of the predetermined data which is combined with the original image data under difficult condition of retrieving the predetermined data.

The invention provides an image processing apparatus comprising:

data combining means for combining predetermined data with original image data on a pixel position with a lower limit gray scale value in a direction of gray scale value decrease, and generating combined image data; and encoding means for encoding the combined image data generated by the data combining means.

In the invention, it is preferable that the data combining means comprises a judging portion for judging whether or not a gray scale value on each pixel position of the original image data is of the lower limit.

According to the invention, by the data combining means, predetermined data, for example, such as image data, music data and character data or the like are combined with the original image data on the pixel position with the lower limit gray scale value in the direction of gray scale value decrease, in other words, in such a way that the gray scale value of the predetermined data is smaller than the lower limit gray scale value of the original image data. Thus, the combined image data is generated. When the gray scale of the original image data is R (R is a positive integer equal to or more than 2), the gray scale value of each pixel is represented by a positive integer ranging from the lower limit 0 to the upper limit R−1. The data combining means combines the predetermined data with the original image data on a pixel position with the lower limit gray scale value 0 and thereby the gray scale value of the combined image data on this pixel position becomes a negative integer.

Since the predetermined data is combined outside the extent of the gray scale of the original image data, image data having the gray scale value within the extent from the upper limit R−1 to the lower limit 0 of the combined image data with the predetermined data is only the original image data. Consequently, when the combined image data with the predetermined data is made visible by display means or like that, only image data having the gray scale value within the extent from the upper limit to the lower limit is made visible and therefore the combined image made visible is the same image as generated in the case of making the original image data visible and there is no deterioration of the quality of the combined image. In addition, since the predetermined data is combined outside the extent of the gray scale of the original image data, a user never perceives this predetermined data and therefore it is difficult for the user to retrieve the predetermined data and thereby illegal deletion of the predetermined data and an illegal copy of the original image data can be prevented.

In addition, since the predetermined data is embedded in the combined image data itself encoded by the encoding means, the predetermined data cannot be separated from the original image data until the combined image data encoded is decoded. Consequently, it is difficult to separate the predetermined data from the combined image data encoded and thereby illegal deletion of the predetermined data can be prevented.

The invention provides an image processing apparatus comprising:

decoding means for decoding encoded combined image data generated by encoding combined image data which is generated by combining predetermined data with original image data on a pixel position with a lower limit gray scale value in a direction of gray scale value decrease, and generating decoded combined image data; and data separating means for separating the predetermined data combined with the original image data on the pixel position with the lower limit gray scale value in the direction of gray scale value decrease from the decoded combined image data generated by the decoding means.

In the invention, it is preferable that the data separating means comprises a judging portion for judging whether or not a gray scale value on each pixel position of the decoded combined image data is smaller than the lower limit.

According to the invention, the data decoding means decodes encoded combined image data generated by encoding combined image data which is generated by combining predetermined data, for example, such as image data, music data and character data or the like with the original image data on the pixel position with the lower limit gray scale value in the direction of gray scale value decrease, in other words, in such a way that the gray scale value of the predetermined data is smaller than the lower limit gray scale value of the original image data. When the gray scale of the original image data is R (R is a positive integer equal to or more than 2), the gray scale value of each pixel is represented by a positive integer ranging from the lower limit 0 to the upper limit R−1.

The data separating means separates the predetermined data combined with the original image data on the pixel position with the lower limit gray scale value 0 in the direction of gray scale value decrease from the decoded combined image data and therefore, when the predetermined data is combined with the original image data as electronic watermark, the predetermined data representing an author of the original image data or the like can be retrieved and confirmed separately from the original image data.

The invention provides an image processing apparatus comprising:

data combining means for combining predetermined data with original image data on a pixel position with an upper limit gray scale value in a direction of gray scale value increase, and generating combined image data; and encoding means for encoding the combined image data generated by the data combining means.

In the invention, it is preferable that the data combining means comprises a judging portion for judging whether or not a gray scale value on each pixel position of the original image data is of the upper limit.

According to the invention, by the data combining means, predetermined data, for example, such as image data, music data and character data or the like are combined with the original image data on the pixel position with the upper limit gray scale value in the direction of gray scale value increase, in other words, in such a way that the gray scale value of the predetermined data is greater than the upper limit gray scale value of the original image data. Thus, the combined image data is generated. When the gray scale of the original image data is R (R is a positive integer equal to or more than 2), the gray scale value of each pixel is represented by a positive integer ranging from the lower limit 0 to the upper limit R−1. The data combining means combines the predetermined data with the original image data on the pixel position with the gray scale value equal to R−1 (upper limit) and thereby the gray scale value of the combined image data on this pixel position becomes a value greater than R−1.

Since the predetermined data is combined outside the gray scale of the original image data, image data having the gray scale value within the extent from the upper limit R−1 to the lower limit 0 of the combined image data with the predetermined data is only the original image data. Consequently, when the combined image data with the predetermined data is made visible by display means or like that, only image data having the gray scale value within the extent from the upper limit to the lower limit is made visible and therefore the combined image made visible is the same image as generated in the case of making the original image data visible and there is no deterioration of the quality of the combined image. In addition, since the predetermined data is combined outside the gray scale of the original image data, a user never perceives this predetermined data and therefore it is difficult for the user to retrieve the predetermined data and thereby illegal deletion of the predetermined data and an illegal copy of the original image data can be prevented.

In addition, since the predetermined data is embedded in the combined image data itself encoded by the encoding means, the predetermined data cannot be separated from the original image data until the combined image data encoded is decoded. Consequently, it is difficult to separate the predetermined data from the combined image data encoded and thereby illegal deletion of the predetermined data can be prevented.

The invention provides an image processing apparatus comprising:

decoding means for decoding encoded combined image data generated by encoding combined image data which is generated by combining predetermined data with original image data on a pixel position with an upper limit gray scale value in a direction of gray scale value increase, and generating decoded combined image data; and data separating means for separating the predetermined data combined with the original image data on the pixel position with the upper limit gray scale value in the direction of gray scale value increase from the decoded combined image data generated by the decoding means.

In the invention, it is preferable that the data separating means comprises a judging portion for judging whether or not a gray scale value on each pixel position of the decoded combined image data is greater than the upper limit.

According to the invention, the data decoding means decodes encoded combined image data generated by encoding combined image data which is generated by combining predetermined data, for example, such as image data, music data and character data or the like with the original image data on the pixel position with the upper limit gray scale value in the direction of gray scale value increase, in other words, in such a way that the gray scale value of the predetermined data is greater than the upper limit gray scale value of the original image data. When the gray scale of the original image data is R (R is a positive integer equal to or more than 2), the gray scale value of each pixel is represented by a positive integer ranging from the lower limit 0 to the upper limit R−1.

The data separating means separates the predetermined data combined with the original image data on the pixel position with the upper limit gray scale value R−1 in the direction of gray scale value increase from the decoded combined image data and therefore, when the predetermined data is combined with the original image data as electronic watermark, the predetermined data representing an author of the original image data or the like can be retrieved and confirmed separately from the original image data.

The invention provides an image processing apparatus comprising:

data combining means for combining a part of predetermined data with original image data on a pixel position with a lower limit gray scale value in a direction of gray scale value decrease and combining a remaining part of the predetermined data with original image data on a pixel position with an upper limit gray scale value in a direction of gray scale value increase, and generating combined image data; and encoding means for encoding the combined image data generated by the data combining means.

In the invention, it is preferable that the data combining means comprises a judging portion for judging whether or not a gray scale value on each pixel position of the original image data is of the upper limit or the lower limit.

According to the invention, by the data combining means, a part of predetermined data, for example, such as image data, music data and character data or the like is combined with the original image data on the pixel position with the lower limit gray scale value in the direction of gray scale value decrease, in other words, in such a way that the gray scale value of the predetermined data is smaller than the lower limit gray scale value of the original image data and the remaining part of predetermined data, for example, such as image data, music data and character data or the like is combined with the original image data on the pixel position with the upper limit gray scale value in the direction of gray scale value increase, in other words, in such a way that the gray scale value of the predetermined data is greater than the upper limit gray scale value of the original image data. Thus, the combined image data is generated. When the gray scale of the original image data is R (R is a positive integer equal to or more than 2), the gray scale value of each pixel is represented by a positive integer ranging from the lower limit 0 to the upper limit R−1.

The data combining means combines the predetermined data with the original image data on the pixel position with the lower limit gray scale value 0 and thereby the gray scale value of the combined image data on this pixel position becomes a negative integer. The data combining means combines the predetermined data with the original image data on the pixel position with the gray scale value equal to R−1 (upper limit) and thereby the gray scale value of the combined image data on this pixel position becomes a value greater than R−1.

Since the predetermined data is combined outside the extent of the gray scale of the original image data, image data having the gray scale value within the extent from the upper limit R−1 to the lower limit 0 of the combined image data with the predetermined data is only the original image data. Consequently, when the combined image data with the predetermined data is made visible by display means or like that, only image data having the gray scale value within the extent from the upper limit to the lower limit is made visible and therefore the combined image made visible is the same image as generated in the case of making the original image data visible and there is no deterioration of the quality of the combined image. In addition, since the predetermined data is combined outside the extent of the gray scale of the original image data, a user never perceives this predetermined data and therefore it is difficult for the user to retrieve the predetermined data and thereby illegal deletion of the predetermined data and an illegal copy of the original image data can be prevented.

In addition, since the predetermined data is embedded in the combined image data itself encoded by the encoding means, the predetermined data cannot be separated from the original image data until the combined image data encoded is decoded. Consequently, it is difficult to separate the predetermined data from the combined image data encoded and thereby illegal deletion of the predetermined data can be prevented.

The invention provides an image processing apparatus comprising:

decoding means for decoding encoded combined image data generated by encoding the combined image data which is generated by combining a part of predetermined data with original image data on a pixel position with a lower limit gray scale value in a direction of gray scale value decrease and combining a remaining part of predetermined data with original image data on a pixel position with an upper limit gray scale value in a direction of gray scale value increase, and generating decoded combined image data; and data separating means for separating a part of the predetermined data combined with the original image data on the pixel position with the lower limit gray scale value in the direction of gray scale value decrease and a remaining part of the predetermined data combined with the original image data on the pixel position with the upper limit gray scale value in the direction of gray scale increase from the decoded combined image data generated by the decoding means.

In the invention, it is preferable that the data separating means comprises a judging portion for judging whether or not the gray scale value on each pixel position of the decoded combined image data is greater than the upper limit and smaller than the lower limit.

According to the invention, the data decoding means decodes encoded combined image data generated by encoding combined image data which is generated by combining a part of predetermined data, for example, such as image data, music data and character data or the like with the original image data on the pixel position with the lower limit gray scale value in the direction of gray scale value decrease, in other words, in such a way that the gray scale value of the predetermined data is smaller than the lower limit gray scale value of the original image data and by combining the remaining part of predetermined data, for example, such as image data, music data and character data or the like with the original image data on the pixel position with the upper limit gray scale value in the direction of gray scale value increase, in other words, in such a way that the gray scale value of the predetermined data is greater than the upper limit gray scale value of the original image data. When the gray scale of the original image data is R (R is a positive integer equal to or more than 2), the gray scale value of each pixel is represented by a positive integer ranging from the lower limit 0 to the upper limit R–1.

The data separating means separates a part of the predetermined data combined with the original image data on the pixel position with the lower limit gray scale value 0 in the direction of gray scale value decrease and a remaining part of the predetermined data combined with the original image data on the pixel position with the upper limit gray scale value R–1 in the direction of gray scale value increase from the decoded combined image data and therefore, when the predetermined data is combined with the original image data as electronic watermark, the predetermined data representing an author of the original image data or the like can be retrieved and confirmed separately from the original image data.

As mentioned above, according to the invention, since the predetermined data is combined outside the extent of the gray scale of the original image data, image data having the gray scale value within the extent from the upper limit to the lower limit of the combined image data with the predetermined data is only the original image data. Consequently, when the combined image data with the predetermined data is made visible by display means or like that, only image data having the gray scale value within the extent from the upper limit to the lower limit is made visible and therefore the combined image made visible is the same image as generated in the case of making the original image data visible and there is no deterioration of the quality of the combined image. In addition, since the predetermined data is combined outside the gray scale of the original image data, a user never perceives this predetermined data.

Consequently, since the predetermined data can be embedded in the original data so that the predetermined data cannot be perceived by a user and there is no deterioration of quality of the image to be displayed on display means even in the case of the predetermined data embedded in the original data. In addition, since a user never perceives this predetermined data, it is difficult for the user to retrieve the predetermined data and thereby illegal deletion of the predetermined data and an illegal copy of the original image data can be prevented.

In addition, since the predetermined data is embedded in the combined image data itself encoded by the encoding means, the predetermined data cannot be separated from the original image data until the combined image data encoded is decoded. Consequently, it is difficult to separate the predetermined data from the combined image data encoded and thereby illegal deletion of the predetermined data can be prevented.

In addition, according to the invention, the data decoding means decodes encoded combined image data generated by encoding combined image data which is generated by combining predetermined data, for example, such as image data, music data and character data or the like with the original image data outside the extent of the gray scale of the original image data. When the gray scale of the original image data is R (R is a positive integer equal to or more than 2), the gray scale value of each pixel is represented by one of positive integers ranging from the lower limit 0 to the upper limit R–1.

The data separating means separates the predetermined data combined outside the extent of the gray scale of the original image data from the decoded combined image data and therefore, when the predetermined data is combined with the original image data as electronic watermark, the predetermined data representing an author of the original image data or the like can be retrieved and confirmed separately from the original image data.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
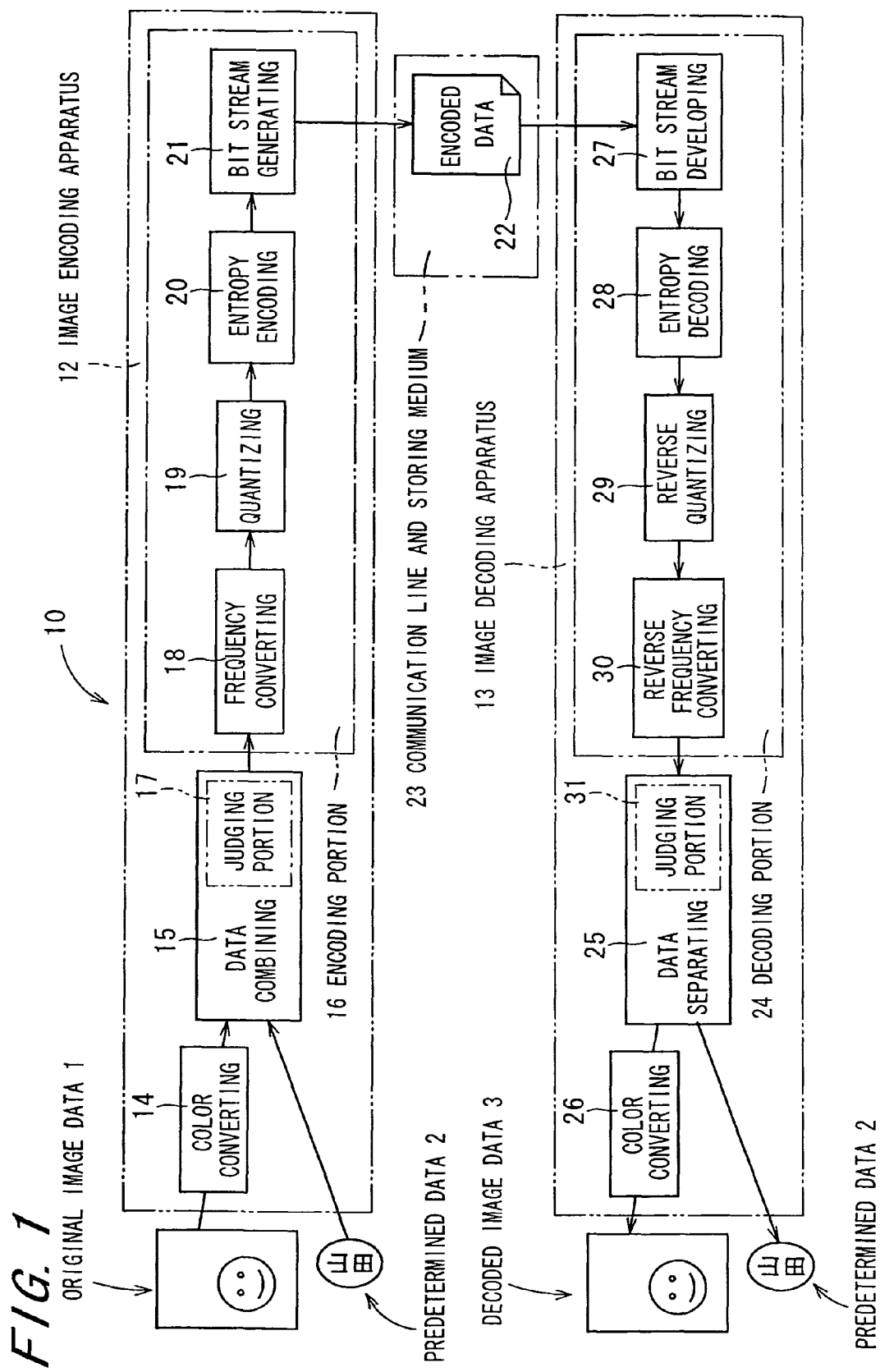
FIG. 1 is a block diagram showing configuration of an image processing apparatus according to one embodiment of the invention.

Now referring to the drawings, preferred embodiments of the invention are described below.

FIG. 1 is a block diagram showing configuration of an image processing apparatus 10 according to one embodiment of the invention. An image processing apparatus 10 comprises an image encoding apparatus 12 and an image decoding apparatus 13.

The image encoding apparatus 12 comprises a color converting portion 14 as color converting means, a data combining portion 15 as data combining means and an encoding portion 16 as encoding means.

The color converting portion 14 converts color space of the original image data 1 represented, for instance, in red (R), green (G) and blue (B) to brightness and two color differences. With regard to the color space represented by the brightness and the two color differences, YCbCr is used for a digital camera and a TV camera and CIELAB is used for a color facsimile. Such color system of the color space as mentioned above is different depending on an application program loaded on the image processing apparatus. However, in the invention, the difference of color system is not essential and a technique of color converting defined by International Standard can be used.

The data combining portion 15 combines predetermined data 2 with the original image data 1 on the pixel position with an upper limit gray scale value in the direction of gray scale value increase, in other words, in such a way that the gray scale value of the predetermined data 2 is greater than the upper limit gray scale value of the original image data 1 and generates combined image data. The data combining portion 15 comprises a judging portion 17. The judging portion 17 judges whether or not the gray scale value on the position of each pixel of the original image data 1 is of the upper limit. When the judging portion 17 judges that the gray scale value on the pixel position of the original image data 1 is of the upper limit, the data combining portion 15 combines the predetermined data 2 with the original image data 1 on this position of the pixel. When the gray scale of the original image data 1 is R, the gray scale value of the original image 1 is represented by a positive integer ranging from the lower limit 0 to the upper limit R−1. In addition, with respect to the gray scale value of the combined image data, the upper limit R−1 is and the lower limit is 0.

The predetermined data 2 is combined with at least one of components of brightness, hue and color difference of the original image data 1. In the embodiment of the invention, the predetermined data 2 is combined with the component of brightness of the original image data 1.

In the embodiment of the invention, the predetermined data 2 is defined as image data. The predetermined data 2 is added to the gray scale value, which is data, of the original image data 1. However, instead of the gray scale value, data represented in binary can be allowed. For instance, when the gray scale value of the original image data 1 is represented in 8 bits, the upper limit gray scale value is represented as 11111111 in binary. For instance, when the predetermined data 2 is represented as 11 in binary, the gray scale value of the combined image data is 100000011 in binary. In another embodiment of the invention, the predetermined data 2, for instance, may be music data, character data or the like, and further encoded image data, encoded music data and encoded character data or the like.

When the gray scale of the original image data 1 is defined as R, the gray scale value is defined as F, the gray scale value of the predetermined data 2 is defined as D and the gray scale value of the combined image data generated by the data combining portion 15 by combining the predetermined data 2 with the original image data 1 is defined as G, the data combining portion 15 generates the combined image data by using the following equations (1) and (2). In the embodiment of the invention, the gray scale value R equal to 256 corresponding to 8 bits is used.

$$G = F (0 \leq F < R-1) \qquad (1)$$

$$G = F + D (F = R-1) \qquad (2)$$

Figure 2:
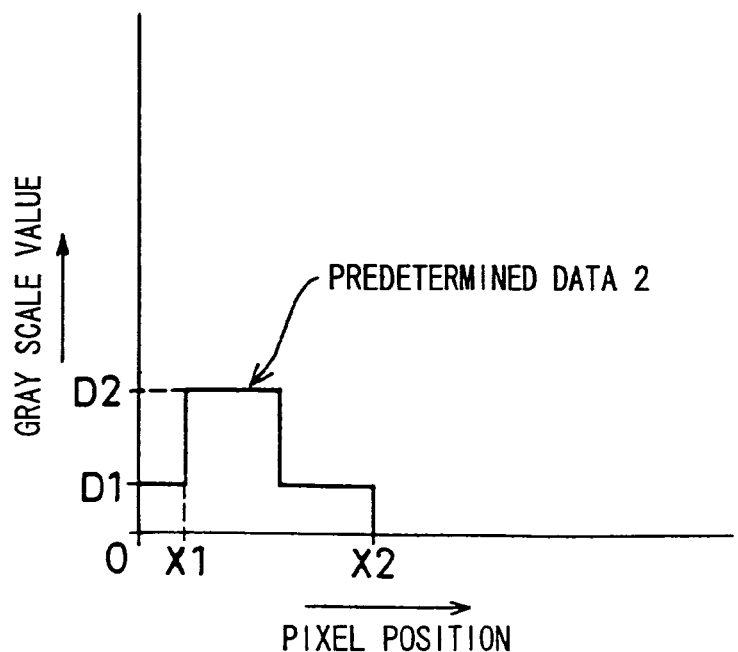
FIG. 2 is a view showing an example of predetermined data.
Figure 3:
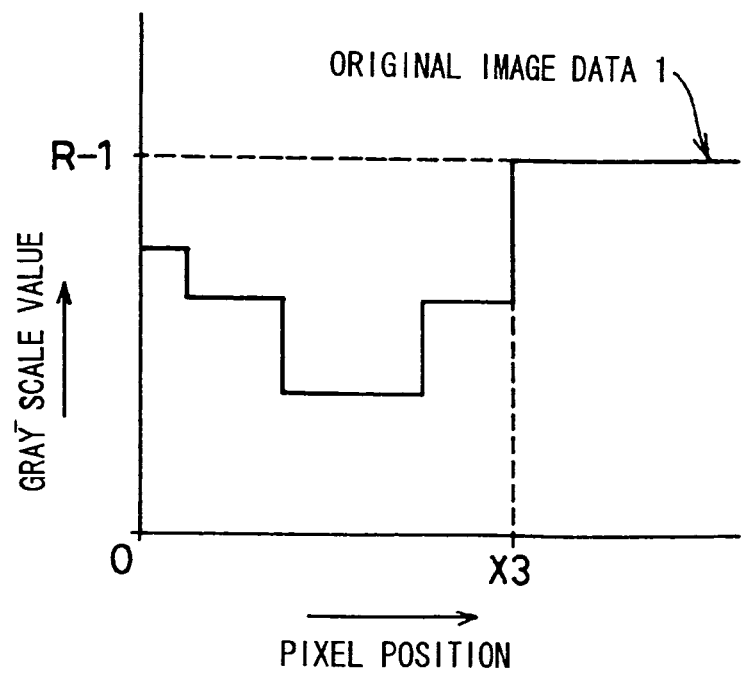
FIG. 3 is a view showing an example of original image data.
Figure 4:
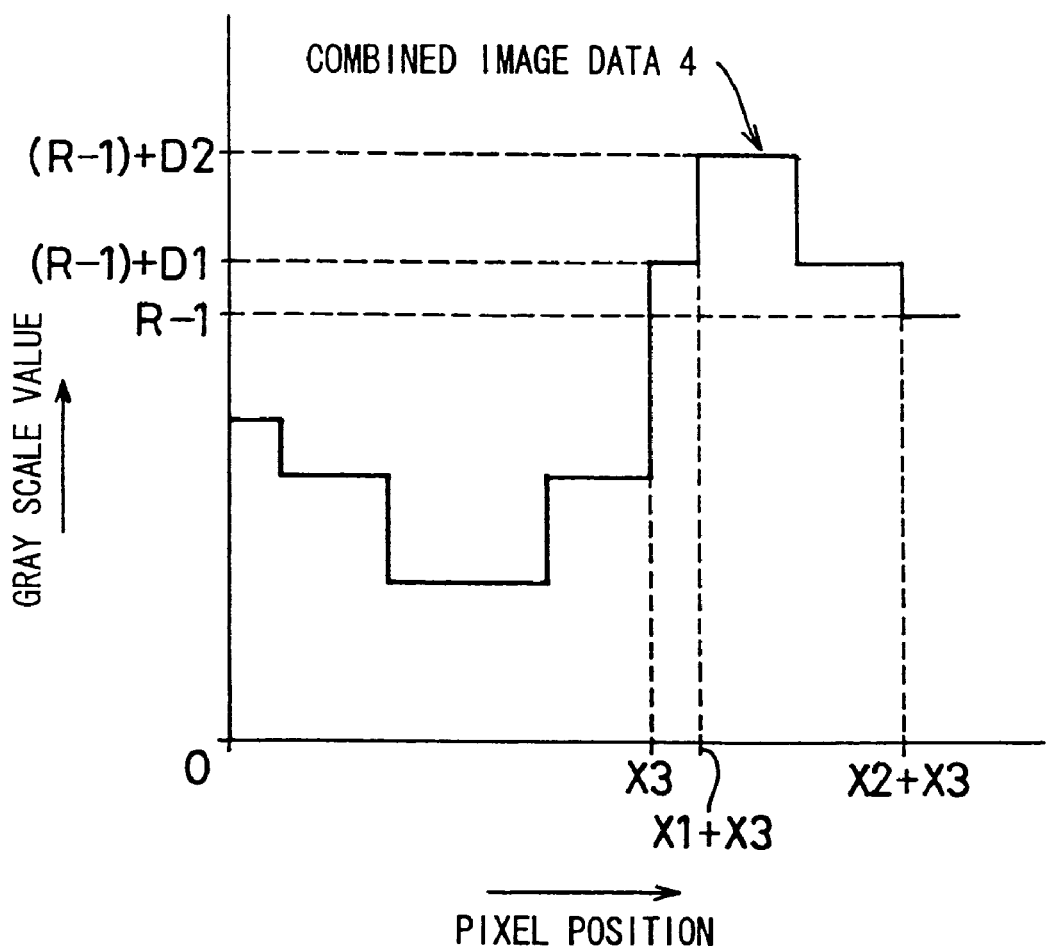
FIG. 4 is a view showing an example of combined image data.

FIG. 2 is a view showing an example of the predetermined data 2, FIG. 3 is a view showing an example of the original image data 1 and FIG. 4 is a view showing an example of the combined image data 4. In these figures, a vertical axis designates the gray scale value and a horizontal axis designates a position of a pixel on one line image. In FIGS. 2 to 4, the pixel position is represented by a positive integer value. The left end of the pixel position is defined as 0, and as the pixel position is shift toward the right, the positive integer value of the pixel position becomes greater. As to the predetermined data 2, the gray scale value on the pixel position 0 is D1, the gray scale value on the pixel position X1 is D2, and the gray scale value on the pixel position X2 is D1. In addition, as to the original image data 1, the gray scale values on the left side from the pixel position X3 are equal to and more than 0 and less than R−1 and the gray scale values on the right side from the pixel position X3 are R−1.

The data combining portion 15 adds the gray scale value of the predetermined data 2 shown in FIG. 2 to the gray scale value of each pixel of the original image data 1 within the extent from the pixel position X3 corresponding to the gray scale value R−1 shown in FIG. 3 to a pixel position X2+X3, to generate the combined image data 4 shown in FIG. 4. The gray scale values of the combined image data 4 on the pixel positions X3, X1+X3 and X2+X3 become (R−1)+D1, (R−1)+D2 and (R−1)+D1, respectively.

As mentioned above, the predetermined data 2 is combined with the original image data 1 on a plurality of pixel positions. When the predetermined data 2 is combined with the original image data 1 on the plurality of pixel positions, the predetermined data 2 is divided and is combined with the original image data 1 on each pixel position. In the other embodiment of the invention, the predetermined data 2 may be combined with the original image data 1 on a single pixel position.

By combining the predetermined data 2 with the original image data 1 with use of the data combining portion 15, combined image data can be made in a state where the predetermined data 2 is embedded in the original image data 1.

Processing performed by the data combining portion 15 is simple processing of adding the gray scale value of the predetermined data 2 to the gray scale value of the original image data 1. Consequently, the data combining portion 15 can perform processing of combining the predetermined data 2 with the original image data 1 and generating the combined image data in a short period of time.

The encoding portion 16 encodes the combined image data generated by the data combining portion 15 and generates encoded combined image data 22. The encoding portion 16 comprises a frequency converting portion 18, a quantizing portion 19, an entropy encoding portion 20 and a bit stream generating portion 21.

The frequency converting portion 18 converts the frequency of the combined image data given from the data combining portion 15 and outputs a frequency component. By performing frequency conversion, a conversion coefficient representing the same number of the frequency components as the number of pixels is obtained. Since one pixel is represented in 8-bit prior to the frequency conversion, for instance, with use of discrete cosine transform (abbreviated as "DCT") as frequency conversion, each conversion coefficient can be represented by a 11-bit integer on condition that the conversion coefficient is rounded off after the decimal point. Either wavelet transform or discrete sine transform (abbreviated as "DST") may be used except DCT as frequency conversion.

In the frequency converting portion 18, even if more than 8-bit value is given as the gray scale value of the image, it is required that frequency conversion is correctly calculated. However, as mentioned above, since there is a case in which more than 8-bit value is given as the value calculated by frequency conversion takes, more than 8-bit memory variable is already secured for a value to be input in many mounting circuits. Consequently, the frequency converting portion 18 can be realized by a general frequency converting circuit.

The quantizing portion 19 quantizes the combined image data which is converted to frequency area given from the frequency converting portion 18. In the quantizing portion 19, a low frequency component is quantized finely and a high frequency component is quantized coarsely and thereby an amount of data is reduced. This utilizes a fact that image quality is not so much lowered because a human's eye is insensitive to the high frequency component even if accuracy of the high frequency component is lowered. In the quantizing portion 19, on the occasion of quantizing the value of the conversion coefficient, quantizing the value is performed with use of a quantizing table representing a width of a quantizing step.

The entropy encoding portion 20 assigns a code to the frequency component quantized in the quantizing portion 19 so that information entropy will become small. The entropy encoding portion 20 assigns a variable length code corresponding to appearance probability of a symbol and minimizes an average code length of data to be output. The entropy encoding portion 20 assigns a code, for instance, a Huffman code and simultaneously generates an encoding table indicating the assigned code.

The bit stream generating portion 21 allocates parameters such as the quantizing table used in the quantizing portion 19 and the encoding table used in the entropy encoding portion 20 or the like to a position complying with a regulation predetermined in advance and generates the encoded image data 22. The regulation predetermined in advance has difference depending on an encoding method. The encoded image data 22 comprises all information such as a size of the image and the quantizing table or the like required for decoding the original image.

The encoded image data 22 output by the image encoding apparatus 12 is stored in the a storing medium 23 via a communication line or the like and then is retrieved to be input in the image decoding apparatus 13.

The image decoding apparatus 13 comprises a decoding portion 24 as decoding means, a data separating portion 25 as data separating means and a color converting portion 26 as color converting means.

The decoding portion 24 decodes the encoded image data 22 encoded by the above mentioned image encoding apparatus 12 and generates decoded image data represented by brightness and color difference. The decoding portion 24 comprises a bit stream developing portion 27, an entropy decoding portion 28, a reverse quantizing portion 29 and a reverse frequency converting portion 30.

The bit stream developing portion 27 retrieves the parameters such as the quantizing table and the encoding table which are required for decoding the encoded image data 22 from the encoded image data 22.

The entropy decoding portion 28 decodes the coded image data given from the bit stream developing portion 27 by using the encoding table generated in the entropy encoding portion 20, to a quantized frequency component.

The reverse quantizing portion 29 reversely quantizes the quantized frequency component given from the entropy decoding portion 28. The reverse quantizing portion 29 decodes the frequency component by using the parameter (i.e. in this case the quantized table used in the quantizing portion 19) retrieved in the bit stream developing portion 27.

The reverse frequency converting portion 30 returns the frequency component given from the reverse quantizing portion 29 to the gray scale value and generates decoded combined image data. The reverse frequency converting portion 30 performs reverse DCT, for instance when the frequency converting portion 18 performs DCT.

The data separating portion 25 separates the predetermined data 2 which is combined with the original image data 1 on the pixel position with the upper limit gray scale value in the direction of gray scale value increase from the decoded combined image data given from the reverse frequency converting portion 30. Concretely, the data separating portion 25 separates the decoded original data 1 and the decoded predetermined data 2. The decoded original data 1 is hereinafter called decoded image data 3. As mentioned above, when the gray scale of the original image data 1 is defined as R, the gray scale value of the original image data 1 is a positive integer ranging from 0 to R−1. In addition, with respect to the gray scale value of the decoded combined image data, the upper limit is R−1 and the lower limit is 0.

The data separating portion 25 comprises a judging portion 31. The judging portion 31 judges whether or not the gray scale value on each pixel position of the decoded combined image data is greater than the upper limit. When the judging portion 31 judges that the gray scale value on the pixel position of the decoded combined image data is greater than the upper limit, the data separating portion 25 separates the predetermined data 2 from the data on this pixel position.

When the decoded image is, for instance, rectangle and pixels are lined on a grid, the judging portion 31 judges whether or not the gray scale value on each pixel position of this original image data is greater than the upper limit by turns in a line direction and judges each pixel on a position which is one-row shifted in a row direction by turns after judgment on one line is finished.

When the gray scale value of the decoded combined image data is defined as G' and the gray scale value of the decoded image data 3 is defined as F' and the gray scale value of the decoded predetermined data 2 is defined as D', the gray scale of the decoded image data 3 ranges from 0 to R−1 and the data separating portion 25 separates the predetermined data 2 and the decoded image data 3 from the decoded combined image data by using the following equations (3) and (4). In addition, the gray scale value of the decoded image data 3 is a positive integer ranging from 0 to R−1.

$$F'=G' (0 \leq G' < R-1) \quad (3)$$

$$F'=R-1,\ D'G'-(R-1)\ (G' \geq R-1) \quad (4)$$

As to decoded combined image data, data on a pixel position with the gray scale value equal to or more than 0 and less than R−1 is defined as the gray scale value of the decoded image data 3 as it is and data on a pixel position with the gray scale value equal to or more than R−1 is defined as the gray scale value R−1 of the decoded image data 3. In addition, as to a value given by subtraction of R−1 from data on a pixel position with the gray scale value equal to or more than R−1, the data is defined as the decoded predetermined data 2.

Since the image processing apparatus 10 in the embodiment of the invention performs lossy compression by decoding portion 24, F is nearly equal to F'(F≈F'), G is nearly equal to G' (G≈G'), and D is nearly equal to D'(D≈D'). The decoded image data 3 which is decoded by the decoding portion 24 and is separated by the data separating portion 25 does not accurately coincide with the original image data 1, but the quantizing table determining a quantizing step is set so that difference between the decoded image data 3 and the original image data 1 will be within an extent of incapability of judging the difference even with use of a human's eye.

Figure 5:
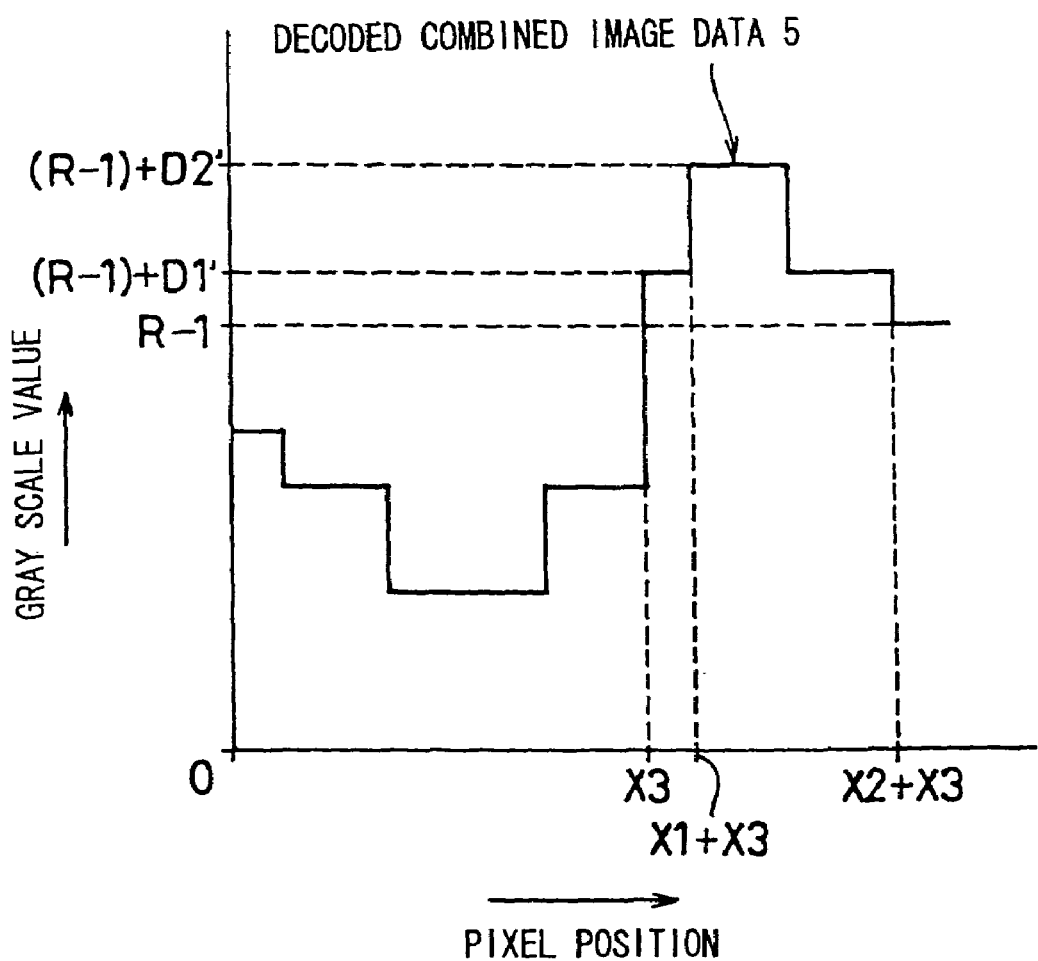
FIG. 5 is a view showing an example of decoded combined image data.
Figure 6:
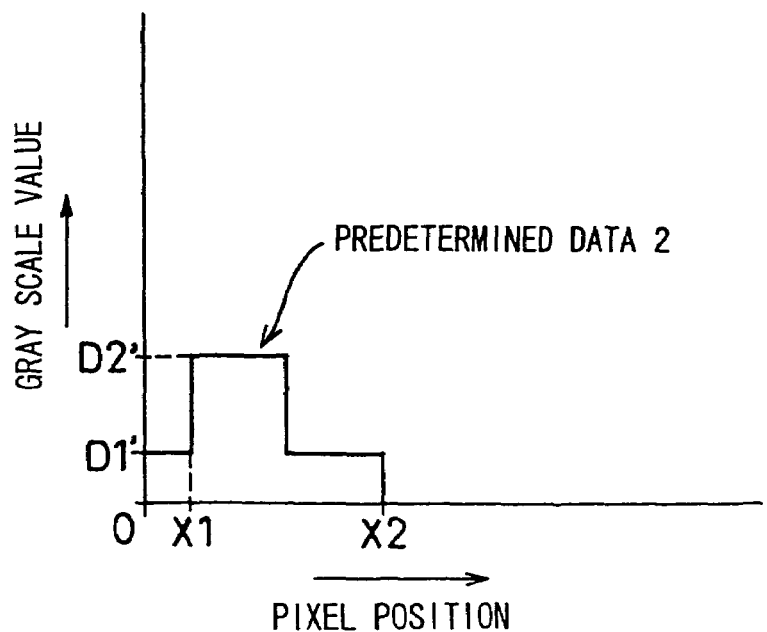
FIG. 6 is a view showing an example of decoded predetermined data.
Figure 7:
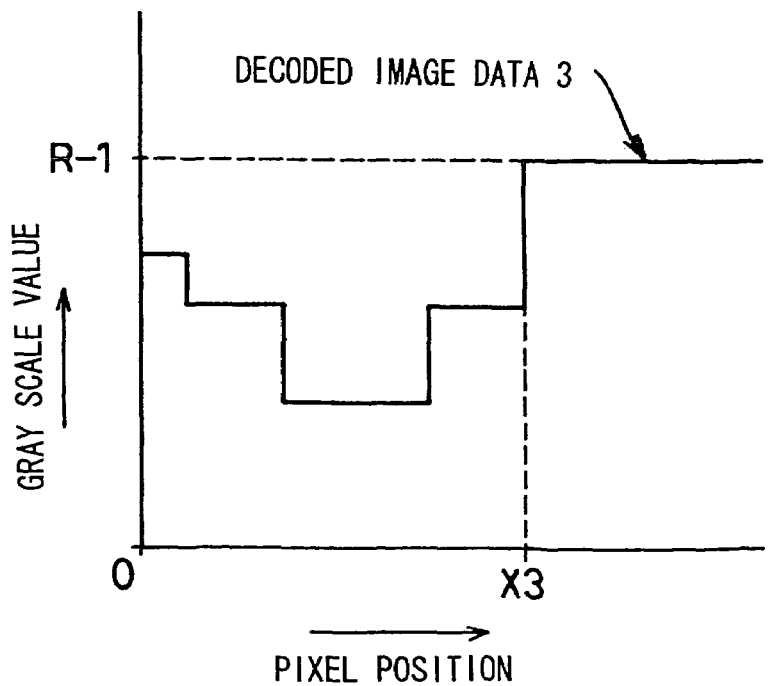
FIG. 7 is a view showing an example of decoded image data.

FIG. 5 is a view showing an example of the decoded combined image data 5, FIG. 6 is a view showing an example of decoded predetermined data 2, and FIG. 7 is a view showing an example of decoded image data 3. In these figures, a vertical axis designates the gray scale value and a horizontal axis designates a position of a pixel on one line image. In FIGS. 5 to 7, the pixel position is represented by a positive integer value. The left end of the pixel position is defined as 0, and as the pixel position is shift toward the right, the positive integer value of the pixel position becomes greater. As to the decoded combined data 5, the gray scale value on the pixel position X3 is (R−1)+D1', the gray scale value on the pixel position (X1+X3) is (R−1)+D2' and the gray scale value from the pixel position X3 to the pixel position (X1+X3) is greater than R−1.

The data separating portion 25 subtracts R−1 from the gray scale value from the pixel position X3 to the pixel position (X1+X3) on which the gray scale value of the encoded combined image data 5 is greater than R−1 as shown in FIG. 5 and thereby can separate the decoded predetermined data 2 as shown in FIG. 6, and defines the gray scale value on the pixel on the right side from the pixel position X3 as R−1 and thereby can separate the decoded image data 3 as shown in FIG. 7. The gray scale values on the pixel positions 0, X1 and X2 of the decoded predetermined data 2 are D',D2' and D3', respectively.

Since the predetermined data 2 is combined with the original data 1 and then frequency conversion is performed for the predetermined data 2 and the predetermined data 2 is quantized, the predetermined data 2 does not perfectly coincide with the encoded predetermined data 2. Therefore, when the predetermined data 2 is utilized as the electronic watermark, care should be taken. However, since the predetermined data 2 cannot be retrieved only after the encoded image data 22 is decoded, it is difficult to retrieve the predetermined data 2 in comparison with a case where the predetermined data is added to a header or the like of the encoded image data and thereby an illegal copy can be restrained.

The color converting portion 26 converts the color space represented by the brightness and the color differences of the decoded image data to color space of a display device and thereby an image can be displayed on the display device. For instance, when the display device is a display, RGB is used. When the display device is a printer, CMYK consisting of cyan (C), magenta(M), yellow (Y), black (K) or the like is used.

When the gray scale of the original image data 1 is defined as R as mentioned above, the gray scale value is a positive integer ranging from 0 to R−1. A 8-bit value 256 is generally used for the gray scale and therefore this value 256 is also defined as the gray scale in the embodiment of the invention. Since there is occurrence of an error arises because of frequency conversion and quantization in the case of lossy encoding of JPEG, JPEG2000 or the like, there is a case where the gray scale value deviates from the extent of the gray scale when the image is decoded. In other words, there is a case where the gray scale value becomes a negative value, i.e., a value smaller than 0 or a value greater than R−1.

When image data is displayed on display means such as the display, the gray scale value of the image data should fit in the extent of the gray scale and therefore, in the decoded side, the frequency component is returned to the gray scale value and then a part exceeding the extent of the gray scale is omitted. Specifically, when the gray scale is 8-bit, a minus gray scale value and the gray scale value more than 256 are defined as 0 and 255 respectively and thereby a final gray scale of the image fits in 8-bit. This processing is called clipping.

Figure 8:
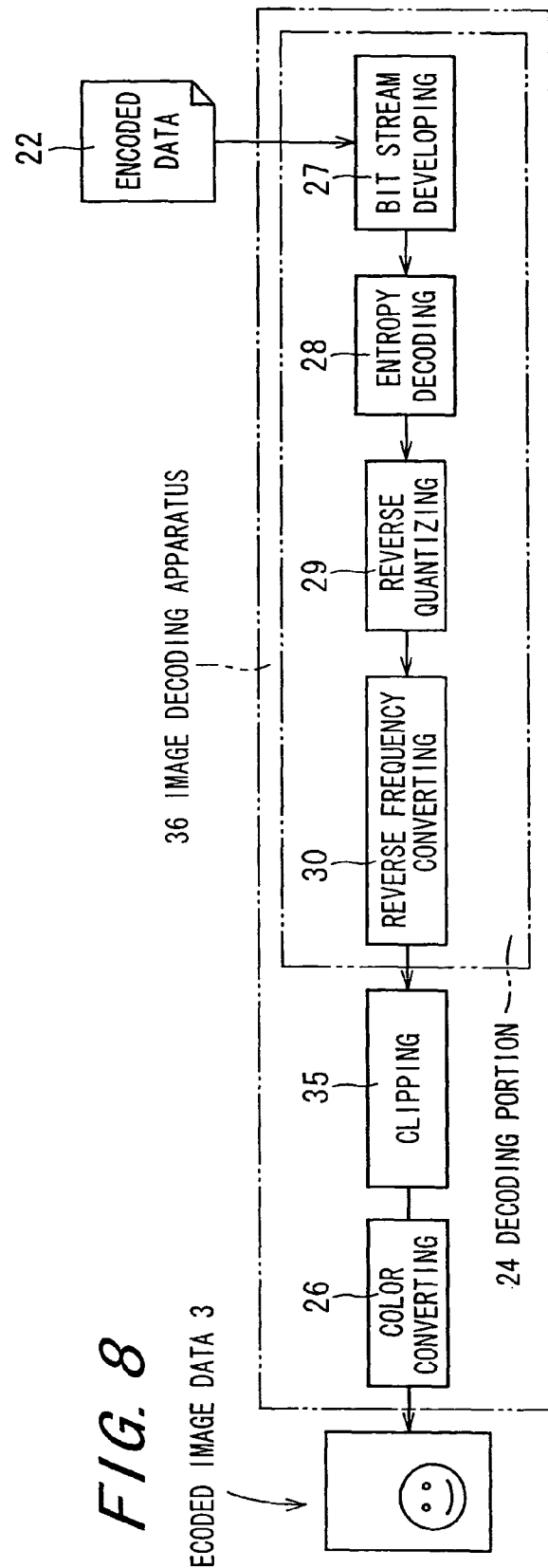
FIG. 8 is a block diagram showing an image decoding apparatus provided with a clipping portion.

FIG. 8 is a block diagram showing an image decoding apparatus 36 provided with clipping portion 35 that executes the clipping. In the image decoding apparatus 36 shown in FIG. 8, the components that play the same or corresponding roles as the image decoding apparatus 13 of the image processing apparatus 10 shown in the above-mentioned FIG. 1 will be identified with the same reference symbols, and detailed descriptions will be omitted.

Figure 9:
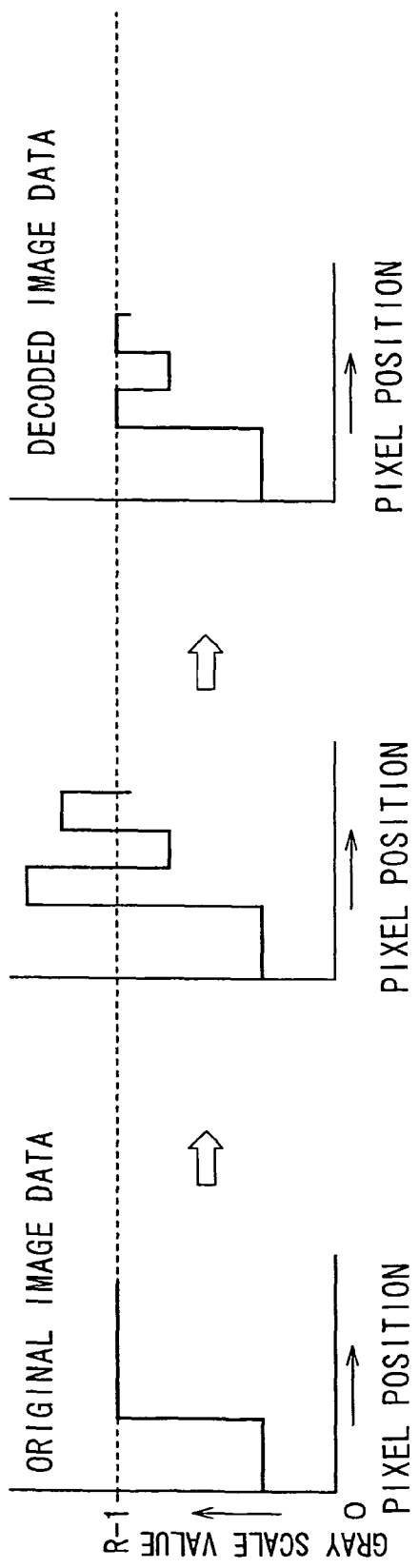
FIGS. 9A to 9C are views showing aspect of processing of clipping gray scale value equal to or more than R to R−1 in connection with noise of decoded image data, when the original image data whose basic color is white includes stair-like edges, which noise arises around the edges.

FIGS. 9A to 9C are views showing aspect of processing of clipping gray scale value equal to or more than R to R−1 in connection with noise of decoded image data, when the original image data whose basic color is white includes stair-like edges, which noise arises around the edges. Such processing of clipping as mentioned above finally enables only noise with pixel value becoming less than R−1 to be visible. In addition, as to gray scale value of image data on the basic color deviating from the extent of the gray scale before encoding the image data, when a width of the gray scale shifted on the basic color is greater than a width of a gray scale of noise, almost all noise disappears by processing of clipping the noise as shown in FIG. 9C.

The clipping portion 35 as clipping means enables the decoded image data 3 to be displayed from the decoded combined image data on the display means by clipping the gray scale value more than R−1. Consequently, the encoded image data 22 encoded by the above-mentioned image encoding apparatus 12 is decoded and the decoded image can be also displayed on the display means of this image decoding apparatus 36.

The image processing apparatus 10 actively utilizes a case where the gray scale value of the pixel exceeds the extent of the gray scale at the time of decoding the image data and combines the predetermined data 2 with a part exceeding the extent of the gray scale before encoding the image data. In the image decoding apparatus 36 shown in FIG. 8, the gray scale value of the pixel exceeding the extent of the gray scale disappears by using the clipping portion 35, but in the image decoding apparatus 13 shown in FIG. 1 separates a part exceeding the extent of the gray scale of the decoded combined image data 5 as the predetermined data 2. Consequently, the image decoding apparatus 13 can retrieve the predetermined data 2 combined with the original image data 1 and for instance, when the predetermined data 2 is used as an electronic watermark, the image decoding apparatus 13 can confirm the predetermined data 2 to be combined with the original image data 1 and representing the author or the like.

In addition, since the predetermined data 2 is combined outside the extent of the gray scale of the original image data 1 in the image processing apparatus 10, data having the gray scale value within the extent from the upper limit R−1 to the lower limit 0 of the combined image data with the predetermined data 2 is only the original image data 1. Consequently, when the combined image data with the predetermined data 2 is made visible by display means or like that, only image data having the gray scale value within the extent from the upper limit R−1 to the lower limit 0 is made visible and therefore the combined image made visible is the same image as generated in the case of making the original image data 1 visible and there is no deterioration of the quality of the combined image. In addition, since the predetermined data 2 is combined outside the extent of the gray scale of the original image data 1, the user never perceives this predetermined data and therefore it is difficult for the user to retrieve the predetermined data and thereby illegal deletion of the predetermined data and an illegal copy of the original image data 1 can be prevented. Consequently, the predetermined data 2 can be effectively utilized as the electronic watermark.

In another embodiment of the invention, an image processing apparatus may be so configured that a subsampling portion is provided between the color converting portion 14 and the data combining portion 15 and an upsampling portion is provided between the data separating portion 25 and the color converting portion 26. As to the subsampling portion, resolution of brightness is maintained as it is and resolution of the color difference is lowered. The subsampling adopts a method in which sampling is performed vertically and horizontally and one pixel of the color difference is made adapted to four pixels of the brightness or a method in which sampling is performed only horizontally and one pixel of the color difference is made adapted to two pixels of the brightness. Sampling may use mean of pixels instead of only pixel skipping. The upsampling portion returns the resolution of the color difference to an original resolution, i.e., the same resolution as that of brightness. The upsampling adopts a method in which the same pixel is copied to four pixel positions of the color difference, and a method in which interpolation is performed or the like, in the case where two pixels of the color difference are adapted to the four pixels of the brightness.

As mentioned above, by providing the subsampling portion and the upsampling portion, an amount of data of the encoded combined image data 22 can be reduced.

In another additional embodiment of the invention, the original data 1 may be handled without color conversion and an image processing apparatus may be so configured that the data combining portion 15 combines the predetermined data 2 with at least one of components of red (R), green (G) and blue (B) of the original data 1.

An image processing apparatus in another additional embodiment of the invention has the same configuration as the image processing apparatus 10 shown in the above mentioned FIG. 1 has and there is difference in only processing of the data combining portion 15 and the data separating portion 25. Note that the components that play the same or corresponding roles as the above-mentioned embodiments will be identified with the same reference symbols. The data combining portion 15 of the embodiment of the invention combines the predetermined data 2 with the original image data 1 on the pixel position with the lower limit gray scale value in the direction of gray scale value decrease, in other words, in such a way that the gray scale value of the predetermined data 2 is smaller than the lower limit gray scale value of the original image data 1 and generates combined image data. The data separating portion 25 separates the predetermined data 2 combined with the original image data 1 on the pixel position with the lower limit gray scale value in the direction of gray scale value decrease, from the decoded combined image data.

The judging portion 17 of the data combining portion 15 judges whether or not the gray scale value on each pixel position of the original image data 1 is of the lower limit. When the judging portion 17 judges that the gray scale value on the pixel position of the original image data 1 is of the lower limit 0, the data combining portion 15 combines the predetermined data 2 with the image data 1 on this position of the pixel.

When the gray scale of the original image data 1 is defined as R, the gray scale value is defined as F, the gray scale value of the predetermined data 2 is defined as D and the gray scale value of the combined image data generated by the data combining portion 15 combining the predetermined data 2 with the original image data 1 is defined as G, the extent of the gray scale of the original data 1 ranges from 0 to R−1 and the data combining portion 15 generates the combined image data by using the following equations (5) and (6). The gray scale value R equal to 256 corresponding to 8 bits is used. The gray scale value of the original image data 1 is represented by a positive integer ranging from 0 to R−1.

$$G = -D (F=0) \quad (5)$$

$$G = F (0 < F \leq R-1) \quad (6)$$

The combined image data is obtained by subtracting the predetermined data 2 from data on a pixel position with the gray scale value 0 of the original image data 1, and by maintaining the original image data 1 on a pixel position with the gray scale value more than 0 and equal to or less than R−1 as it is.

Figure 10:
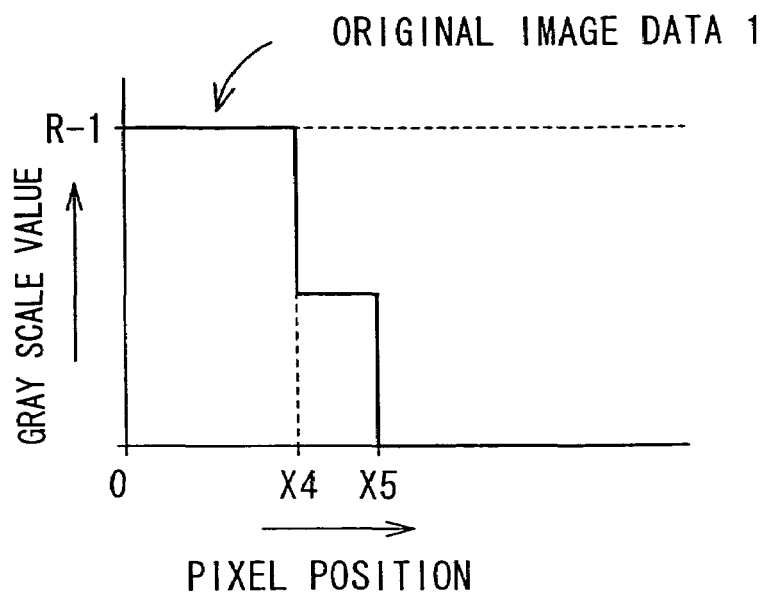
FIG. 10 is a view showing an example of original image data.
Figure 11:
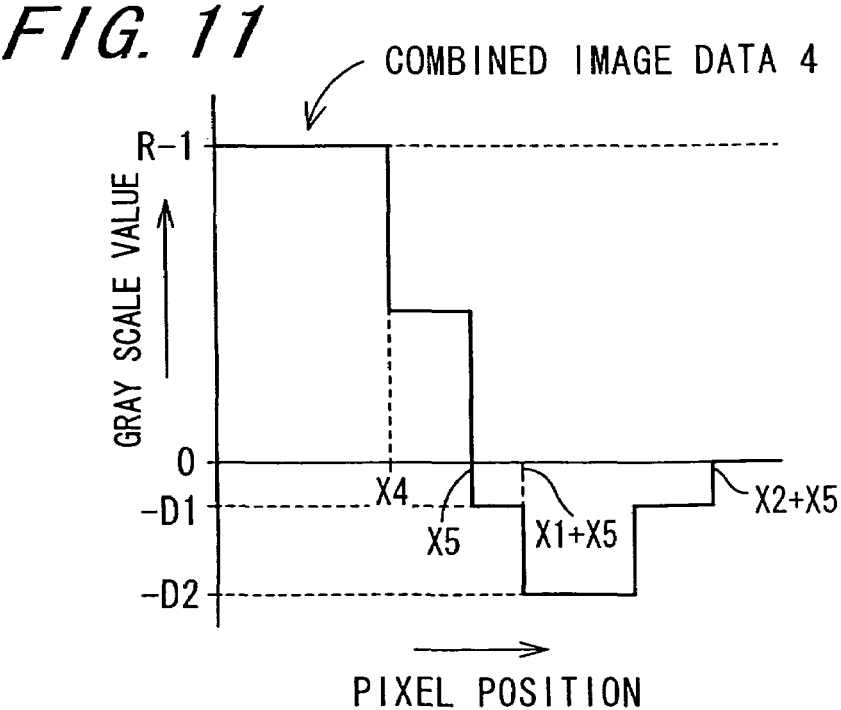
FIG. 11 is a view showing an example of combined image data generated by combining predetermined data with the original image data.

FIG. 10 is a view showing an example of original image data 1, and FIG. 11 is a view showing an example of the combined image data 4 generated by combining the predetermined data 2 shown in FIG. 2 with the original image data 1. In these figures, a vertical axis designates the gray scale value and a horizontal axis designates a position of a pixel on one line image. In FIGS. 10 and 11, the pixel position is represented by a positive integer value. The left end of the pixel position is defined as 0, and as the pixel position is shift toward the right, the positive integer value of the pixel position becomes greater. As to the original image data 1, the gray scale value on a position on the left side from the pixel position X5 is more than 0 and equal to and less than R−1 and the gray scale value on a position on the right side from the pixel position X5 is 0.

The data combining portion 15 generates the combined image data 4 shown in FIG. 11 by subtracting the gray scale value of the predetermined data 2 shown in FIG. 2 from the gray scale value of each pixel of the original image data 1 shown in FIG. 3 within the extent of the pixel position from X5 corresponding to the gray scale value 0 shown in FIG. 10 to (X2+X5). The gray scale values of the combined image data 4 on the pixel positions X5, X1+X5 and X2+X5 become −D1, −D2 and −D1, respectively.

The judging portion 31 of the data separating portion 25 judges whether or not the gray scale value on each pixel position of the decoded combined image data is smaller than the lower limit. When the judging portion 31 judges that the gray scale value on the pixel position of the decoded combined image data is smaller than the lower limit 0, the data separating portion 25 separates the predetermined data 2 from the data on this pixel position.

When the gray scale value of the decoded combined image data is defined as G' and the gray scale value of the decoded image data 3 is defined as F' and the gray scale value of the decoded predetermined data 2 is defined as D', the gray scale of the decoded image data ranges from 0 to R−1 and the data separating portion 25 separates the predetermined data and the decoded image data from the decoded combined image data by using the following equations (7) and (8). The gray scale value of the decoded image data 3 is a positive integer ranging from 0 to R−1.

$$F' = 0, \; D' = -G' (G' \leq 0) \quad (7)$$

$$F' = G' (0 < G' \leq R-1) \quad (8)$$

As to decoded combined image data, data on a pixel position with the gray scale value equal to or less than 0 corresponds to the decoded predetermined data 2. In addition, as to decoded combined image data, data on a pixel position with the gray scale value equal to or less than 0 is identified with the gray scale value 0 of the decoded image data, and data on a pixel position with the gray scale value more than 0 and equal to and less than R−1 corresponds to the gray scale value of the decoded image data 3 as it is.

Figure 12:
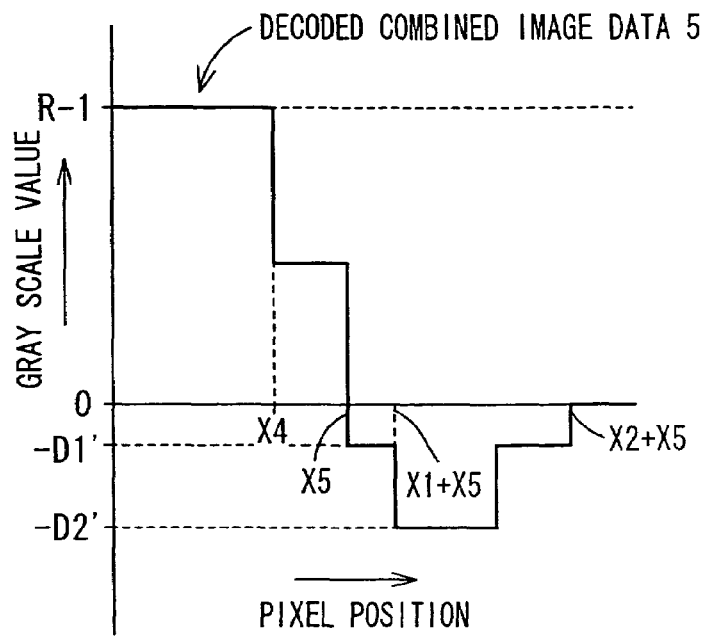
FIG. 12 is a view showing an example of decoded combined image data.
Figure 13:
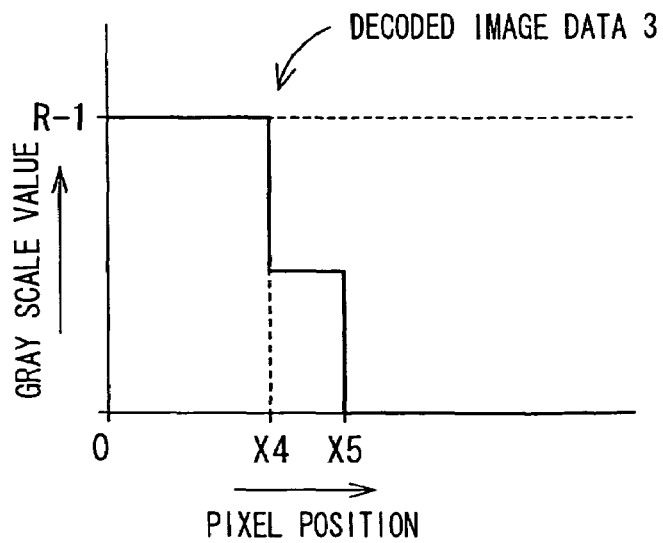
FIG. 13 is a view showing an example of decoded image data.

FIG. 12 is a view showing an example of the decoded combined image data 5 and FIG. 13 is a view showing an example of decoded image data 3. In these figures, a vertical axis designates the gray scale value and a horizontal axis designates a position of a pixel on one line image. In FIGS. 12 and 13, the pixel position is represented by a positive integer value. The left end of the pixel position is defined as 0, and as the pixel position is shifted toward the right, the positive integer value of the pixel position becomes greater. As to the decoded combined image data 5, the gray scale value on a position on the left side from X5 is greater than 0 and the gray scale value from the pixel position X4 to the pixel position (X2+X5) is smaller than 0.

The data separating portion 25 changes a sign of the gray scale value from the pixel position X5 to the pixel position X2+X5 on which the gray scale value of the encoded combined image data 5 is smaller than 0, i.e. negative value, as shown in FIG. 12. and separates the predetermined data 2 as shown in FIG. 6 and defines the gray scale value on the pixel position on the right side from the pixel position X5 as 0 and thereby can separate the decoded image data 3 as shown in FIG. 13.

The image processing apparatus in another additional embodiment of the invention has the same configuration as the image processing apparatus 10 shown in the above mentioned FIG. 1 has and there is difference in only processing of the data combining portion 15 and the data separating portion 25. Note that the components that play the same or corresponding roles as the above-mentioned embodiments will be identified with the same reference symbols. The data combining portion 15 according to the embodiment of the invention combines a part of the predetermined data 2 with the original image data 1 on the pixel position with the upper limit gray scale value in the direction of gray scale value increase, in other words, in such a way that the gray scale value of the predetermined data 2 is smaller than the upper limit gray scale value of the original image data 1, moreover the data combining portion 15 combines a remaining part of the predetermined data 2 with the original image data 1 on the pixel position with the lower limit gray scale value in the direction of gray scale value decrease, in other words, in such a way that the gray scale value of the predetermined data 2 is smaller than the lower limit gray scale value of the original image data 1 and the data combining portion 15 generates combined image data. The data separating portion 25 separates the part of the predetermined data 2 combined with the original image data 1 on the pixel position with the upper limit gray scale value in the direction of gray scale value increase, from the decoded combined image data, and the data separating portion 25 also separates the remaining part of predetermined data 2 combined with the original image data 1 on the pixel position with the lower limit gray scale value in the direction of gray scale value decrease, from the decoded combined image data.

The judging portion 17 of the data combining portion 15 judges whether or not the gray scale value on each pixel position of the original image data 1 is of the upper limit or the lower limit. When the judging portion 17 judges that the gray scale value on the pixel position of the original image data 1 is of the upper limit R−1 or the lower limit 0, the data combining portion 15 combines the predetermined data 2 with the image data 1 on this position of the pixel.

When the gray scale of the original image data 1 is defined as R, the gray scale value is defined as F, the gray scale value of the predetermined data 2 is defined as D and the gray scale value of the combined image data generated by the data combining portion 15 combining the predetermined data 2 with the original image data 1 is defined as G, the extent of the gray scale of the original data 1 ranges from 0 to R−1 and the data combining portion 15 generates the combined image data by using the following equations (9), (10) and (11). For example, the gray scale value R equal to 256 corresponding to 8 bits is used. The gray scale value of the original data is represented by a positive integer ranging from 0 to R−1.

$$G=-D (F=0) \tag{9}$$

$$G=F\ (0<F<R-1) \tag{10}$$

$$G=F+D (F=R-1) \tag{11}$$

The combined image data is obtained by maintaining data on a pixel position with the gray scale value equal to or more than 0 and less than R−1 of the original image data 1 corresponds to the combined image data as it is, and adding a part of the predetermined data 2 to data on a pixel position with the upper limit gray scale value R−1.

The combined image data is obtained by subtracting a part of the predetermined data 2 from data on a pixel position with the gray scale value 0 and maintaining the original image data 1 on a pixel position with the gray scale value more than 0 and equal to or less than R−1 as it is.

Figure 14:
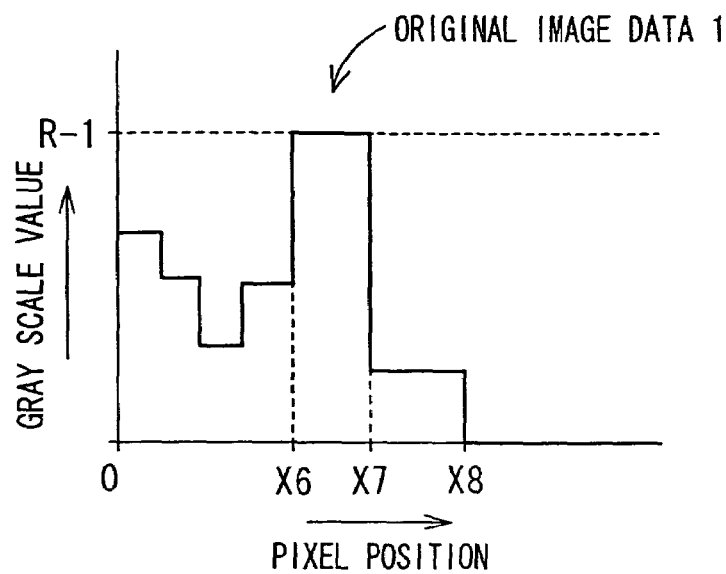
FIG. 14 is a view showing an example of the original image data.
Figure 15:
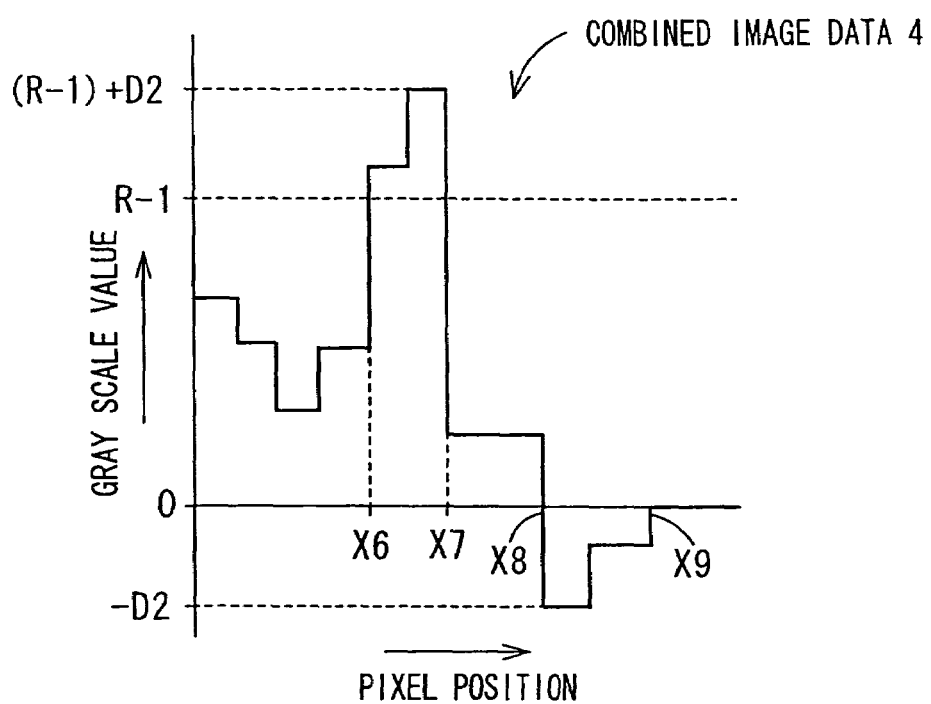
FIG. 15 is a view showing an example of combined image data generated by combining predetermined data with the original image data.

FIG. 14 is a view showing an example of original image data 1, and FIG. 15 is a view showing an example of combined image data 4 generated by combining the predetermined data 2 shown in FIG. 2 with the original image data 1. In these figures, a vertical axis designates the gray scale value and a horizontal axis designates a position of a pixel on one line image. In FIGS. 14 and 15, the pixel position is represented by a positive integer value. The left end of the pixel position is defined as 0, and as the pixel position is shifted toward the right, the positive integer value of the pixel position becomes greater. As to the original image data 1, the gray scale value on a position on the left side from the pixel position X6 is more than 0 and equal to and less than R−1 and the gray scale value on a pixel position from X6 to X7 is R−1 and the gray scale value which is on a position on the right side from the pixel position X7 and on a position on the left side from the pixel position X8 is greater than 0 and equal to and less than R−1 and the gray scale value on a position on the light side from the pixel position X8 is 0.

The data combining portion 15 generates the combined image data shown in FIG. 11 by adding a part of the predetermined data 2 shown in FIG. 2 to the gray scale value of each pixel of the original image data 1 within the extent of the pixel position from X6 corresponding to the gray scale value R−1 shown in FIG. 14 to X7 and by subtracting the remaining part of the predetermined data 2 shown in FIG. 2 from each pixel on a position on the right side from the pixel position X8 corresponding to the gray scale value 0 of the original image data 1. Here, the pixel positions X1, X6 and X7 comply with the following inequality.

$$(X7-X6)>X1$$

The gray scale values of the combined image data 4 on the pixel positions X6, X7, X8 and X9={X8+(X7−X6)−X2} become (R−1)+D1, (R−1)+D2, −D2 and −D1, respectively.

The judging portion 31 of the data separating portion 25 judges whether or not the gray scale value on each pixel position of the decoded combined image data is greater than the upper limit and smaller than the lower limit. When the judging portion 31 judges that the gray scale value on the pixel position of the decoded combined image data is greater than the upper limit R−1 or smaller than the lower limit 0, the data separating portion 25 separates the predetermined data 2 from the data on this pixel position.

When the gray scale value of the decoded combined image data is defined as G' and the gray scale value of the decoded image data 3 is defined as F' and the gray scale value of the decoded predetermined data 2 is defined as D', the extent of the gray scale of the decoded image data 3 ranges from 0 to R−1 and the data separating portion 25 separates the predetermined data 2 and the decoded image data 3 from the decoded combined image data by using the following equations (12), (13) and (14). The gray scale value of the decoded image data 3 is a positive integer ranging from 0 to R−1.

$$F'=0,\ D'=-G' (G'\leq 0) \tag{12}$$

$$F'=G' (0<G'<R-1) \tag{13}$$

$$F'=R-1,\ D'=G'-(R-1)\ (G'\geq R-1) \tag{14}$$

As to the decoded combined image data, the gray scale value on a pixel position with the gray scale value equal to or more than 0 and less than R−1 corresponds to the gray scale value of the decoded image data 3 as it is. In addition, as to decoded combined image data, the gray scale value on a pixel position with the gray scale value equal to or more than R−1 is identified with the gray scale value R−1 of the decoded image data 3. In addition, the value subtracting the gray scale value R−1 from data on a pixel position with the gray scale value equal to or more than R−1 corresponds to a part of the decoded predetermined data 2.

In addition, as to the decoded combined image data, the gray scale value on a pixel position with the gray scale value equal to or less than 0 corresponds to the gray scale value of the decoded predetermined data 2. In addition, as to the decoded combined image data, data on a pixel position with the gray scale value equal to or less than 0 is identified with the gray scale value 0 of the decoded image data, and the gray scale value on a pixel position with the gray scale value more than 0 and equal to and less than R−1 corresponds to the gray scale value of the decoded image data 3 as it is.

Figure 16:
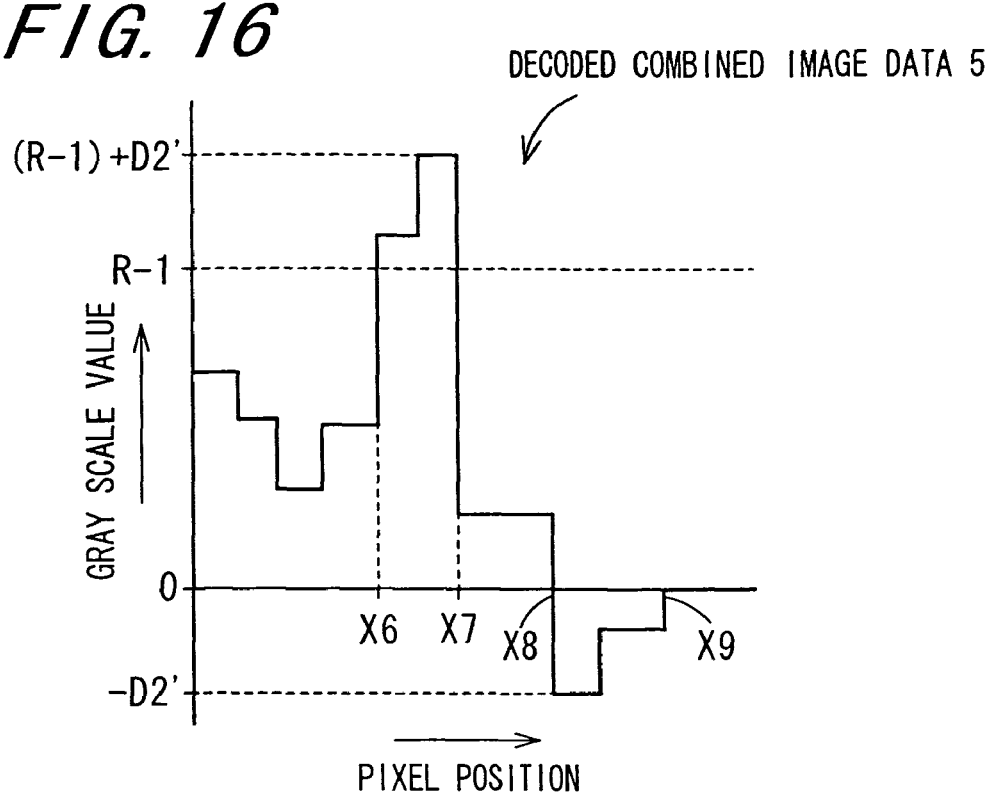
FIG. 16 is a view showing an example of decoded combined image data.
Figure 17:
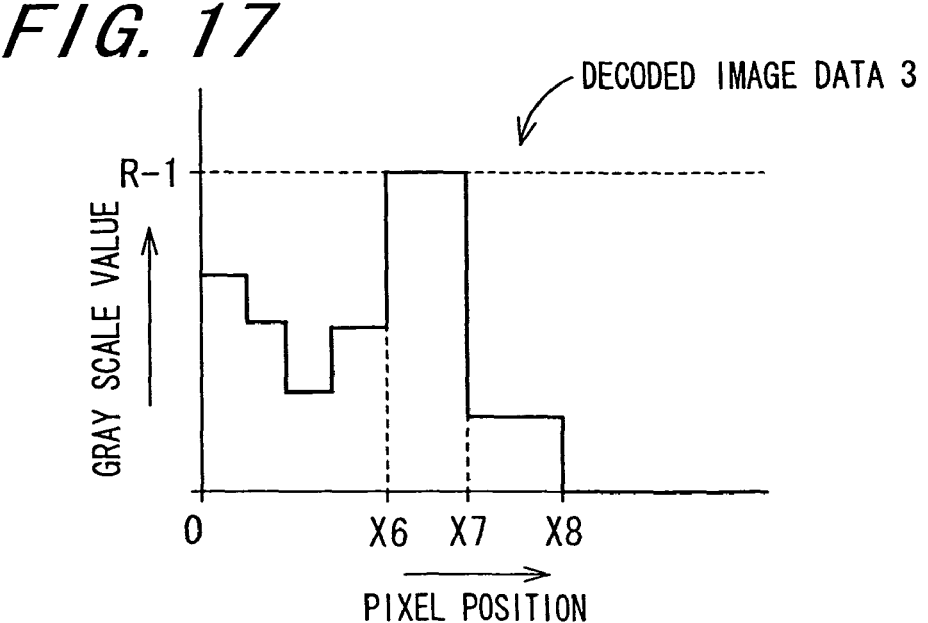
FIG. 17 is a view showing an example of the decoded image data.

FIG. 16 is a view showing an example of the decoded combined image data 5 and FIG. 17 is a view showing an example of decoded image data 3. In these figures, a vertical axis designates the gray scale value and a horizontal axis designates a position of a pixel on one line image. In FIGS. 16 and 17, the pixel position is represented by a positive integer value. The left end of the pixel position is defined as 0, and as the pixel position is shifted toward the right, the positive integer value of the pixel position becomes greater. As to the decoded combined image data 5, the gray scale value on a position on the left side from X6 is greater than 0 and smaller than R−1, and the gray scale value from the pixel position X6 to the pixel position X7 is greater than R−1. The gray scale value which is on a position on the right side from the pixel position X7 and is on a position on the left side from the pixel position X8 is greater than 0 and smaller than R−1, and the gray scale value from the pixel position X8 to the pixel position X9 is smaller than 0.

The data separating portion 25 separates a part of the predetermined data 2 as shown in FIG. 6 by subtracting R−1 from the gray scale value greater than R−1 from the pixel position X6 to the pixel position X7, and changes a sign of the gray scale value from the pixel position X8 to the pixel position X9 on which the gray scale value of the decoded image data 3 is smaller than 0 and separates the remaining part of the predetermined data 2 as shown in FIG. 6. In addition, the data separating portion 25 can separate the decoded image data 3 shown in FIG. 17 by identifying the gray scale value from the pixel position X6 to the pixel position X7 on which the gray scale value of the decoded image data 3 as shown in FIG. 16 is greater than R−1, with R−1 and identifying the gray scale value from the pixel position X8 to the pixel position X9 on which the gray scale value of the decoded image data 3 is smaller than 0, with 0.

As mentioned above, by combining a part of the predetermined data 2 with the original image data 1 with the upper limit gray scale value in the direction of gray scale value increase and combining the remaining part of the predetermined data 2 with the original image data 1 with the lower limit gray scale value in the direction of gray scale value decrease, the whole gray scale of the combined image data is made small and more data can be embedded in less number of bits in comparison with a case where the predetermined data 2 is combined with only original image data 1 with the gray scale value equal to the upper limit in the direction of gray scale value increase and a case where the predetermined data 2 is combined with only original image data 1 with the lower limit gray scale value in the direction of gray scale value decrease.

Since the encoded image data 22 generated by image encoding apparatus 12 mentioned above complies with format specified in JPEG and JPEG2000, an existing decoder for decoding JPEG and JPEG2000 can also decode the encoded image data 22. Therefore, even when the image data is data with embedded predetermined data 2, the image data can be handled similarly to image data without embedded predetermined data 2.

According to the embodiments of the invention, the original image data may be either still image data or motion image data. In the case of motion image data, for instance in MPEG (Motion Picture Coding Expert Group), the original image data in which the predetermined data is embedded is I picture which is reference image data.

Since standard image encoding system widely used for encoding not only motion image and still image, but also natural image can be adopted for encoding processing performed by the encoding portion 16, this facilitates the implementation of the encoding portion 16 by a logic circuit, and it is possible to incorporate an encoding program in the encoding portion 16 in every kind of application program.

The invention can be preferably implemented for application program which is embedded in WWW browser, a color facsimile, a cellular phone with display unit or the like and handles still image and motion image.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An image processing apparatus comprising:
   data combining means for combining predetermined data with original image data on a pixel position with a lower limit gray scale value in a direction of gray scale value decrease, and generating combined image data; and
   encoding means for encoding the combined image data generated by the data combining means.

2. The image processing apparatus of claim 1, wherein the data combining means comprises a judging portion for judging whether or not a gray scale value on each pixel position of the original image data is of the lower limit.

3. An image processing apparatus comprising:
   decoding means for decoding encoded combined image data generated by encoding combined image data which is generated by combining predetermined data with original image data on a pixel position with a lower limit gray scale value in a direction of gray scale value decrease, and generating decoded combined image data; and
   data separating means for separating the predetermined data combined with the original image data on the pixel position with the lower limit gray scale value in the direction of gray scale value decrease from the decoded combined image data generated by the decoding means.

4. The image processing apparatus of claim 3, wherein the data separating means comprises a judging portion for judging whether or not a gray scale value on each pixel position of the decoded combined image data is smaller than the lower limit.

5. An image processing apparatus comprising:
   data combining means for combining predetermined data with original image data on a pixel position with an upper limit gray scale value in a direction of gray scale value increase, and generating combined image data; and
   encoding means for encoding the combined image data generated by the data combining means.

6. The image processing apparatus of claim 5, wherein the data combining means comprises a judging portion for judging whether or not a gray scale value on each pixel position of the original image data is of the upper limit.

7. An image processing apparatus comprising:
   decoding means for decoding encoded combined image data generated by encoding combined image data which is generated by combining predetermined data with original image data on a pixel position with an upper limit gray scale value in a direction of gray scale value increase, and generating decoded combined image data; and
   data separating means for separating the predetermined data combined with the original image data on the pixel position with the upper limit gray scale value in the direction of gray scale value increase from the decoded combined image data generated by the decoding means.

8. The image processing apparatus of claim 7, wherein the data separating means comprises a judging portion for judging whether or not a gray scale value on each pixel position of the decoded combined image data is greater than the upper limit.

9. An image processing apparatus comprising:
   data combining means for combining a part of predetermined data with original image data on a pixel position with a lower limit gray scale value in a direction of gray scale value decrease and combining a remaining part of the predetermined data with original image data on a pixel position with an upper limit gray scale value in a direction of gray scale value increase, and generating combined image data; and encoding means for encoding the combined image data generated by the data combining means.

10. The image processing apparatus of claim 9, wherein the data combining means comprises a judging portion for judging whether or not a gray scale value on each pixel position of the original image data is of the upper limit or the lower limit.

11. An image processing apparatus comprising:

decoding means for decoding encoded combined image data generated by encoding the combined image data which is generated by combining a part of predetermined data with original image data on a pixel position with a lower limit gray scale value in a direction of gray scale value decrease and combining a remaining part of predetermined data with original image data on a pixel position with an upper limit gray scale value in a direction of gray scale value increase, and generating decoded combined image data; and data separating means for separating a part of the predetermined data combined with the original image data on the pixel position with the lower limit gray scale value in the direction of gray scale value decrease and a remaining part of the predetermined data combined with the original image data on the pixel position with the upper limit gray scale value in the direction of the gray scale increase from the decoded combined image data generated by the decoding means.

12. The image processing apparatus of claim 11, wherein the data separating means comprises a judging portion for judging whether or not a gray scale value on each pixel position of the decoded combined image data is greater than the upper limit and smaller than the lower limit.

* * * * *